(No Model.)
H. V. HAYES.
ELECTRICAL MEASUREMENT APPARATUS.
No. 381,780. Patented Apr. 24, 1888.
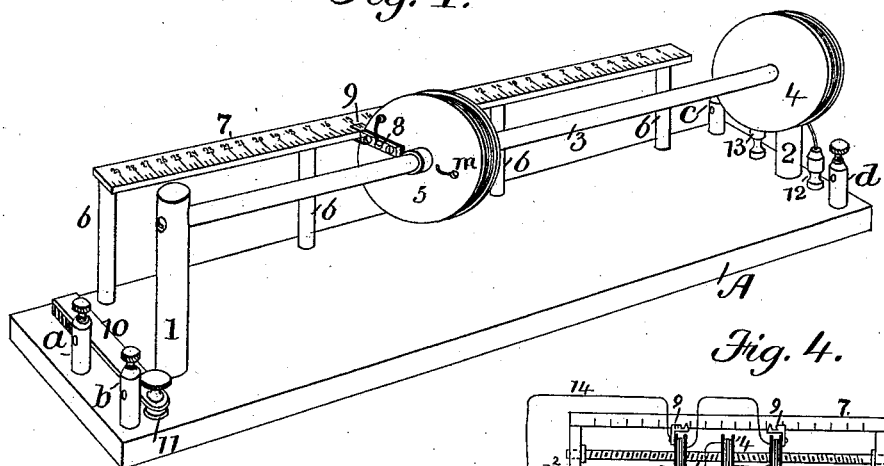
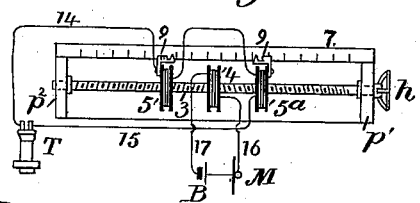
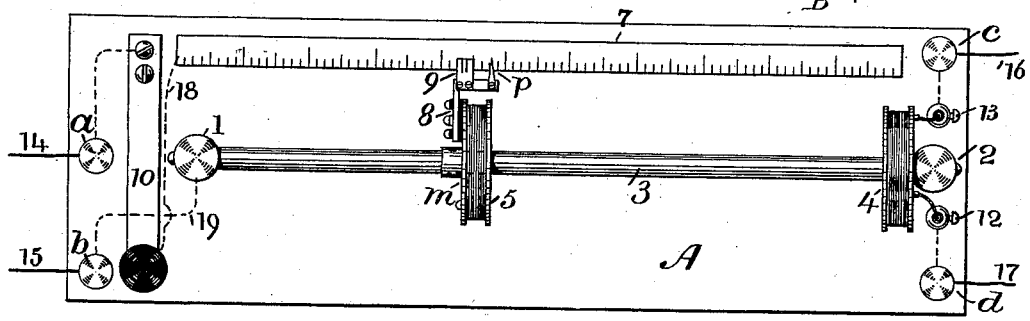
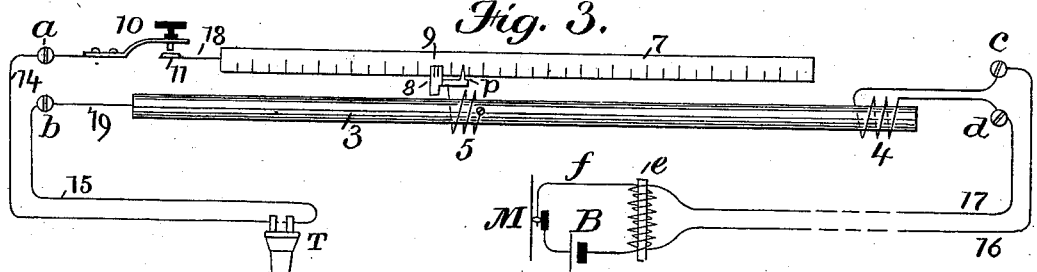
Witnesses.
Geo. Willis Pierce
Fred. J. F. Schwarz
Inventor.
Hammond V. Hayes.

UNITED STATES PATENT OFFICE.

HAMMOND V. HAYES, OF CAMBRIDGE, MASSACHUSETTS.

ELECTRICAL-MEASUREMENT APPARATUS.

SPECIFICATION forming part of Letters Patent No. 381,780, dated April 24, 1888.

Application filed April 22, 1887. Serial No. 235,789. (No model.)

*To all whom it may concern:*

Be it known that I, HAMMOND V. HAYES, residing at Cambridge, in the county of Middlesex and State of Massachusetts, have invented certain Improvements in Electrical-Measurement Apparatus, of which the following is a specification.

This invention is an instrument for the comparison and comparative measurement of electrical currents, and especially those employed in the art of electrically transmitting and reproducing speech.

The object I have in view is to provide an apparatus whereby the relative efficiency of transmitters or induction-coils may be readily and quickly determined, and whereby different electrical currents may be accurately compared, or whereby the efficiency of any current developed from the same transmitting-instrument may be noted at different points of a long circuit and its fall in power determined as the distance from the transmitting end increases.

The instrument delineated in the drawings which form a part of this specification I have found to be well adapted for the attainment of these objects.

It consists in mounting two similar helices of insulated wire, one of which (or both, if desired) is movable, on a horizontal support, and in passing the electrical current to be examined and compared through one of them, and attaching to the other in circuit therewith a telephone. Any change occurring in the condition of the said current may be at once noted by induction by means of the telephone, which, as is well known, is a most delicate galvanoscope. The two coils are adjusted with respect to one another until, notwithstanding the continuance of the changes in the electrical condition of one, no sound is perceptible in the telephone connected with the other. I provide a graduated scale and attach a pointer or vernier, if desired, to the movable coil, by which the distance between the two coils may conveniently be observed, and if the coils are both made movable both would preferably be provided with a pointer. I introduce a circuit closing and breaking key in the circuit of the telephone-coil, so that by making and breaking the said circuit the ear may be assisted in determining the precise point where and when absolute silence is obtained.

Although this apparatus was designed with an especial view to its employment in connection with telephone-transmitters, it is not thought necessary here to discuss the theory of the articulating-telephone. It is sufficient to state that upon the amplitude of variation in the telephonic current depends the loudness of the reproduced sounds, and that, therefore, the most efficient transmitting apparatus (other conditions being assumed) is that which has the ability to excite variations of the greatest amplitude.

In practicing the art of telephony it is frequently necessary to determine the relative efficiency of two transmitters or the efficiency of a number as compared with a standard. It is also necessary to determine the efficiency of two or more induction-coils when each and all are used in connection with the same transmitter and battery, and to determine the fall in power of the operative current as the distance of the receiver from the transmitter is increased. In other words, it is necessary to comparatively measure the strength of the current derived from the different transmitters or coils, and equally so the strength of the current at various points in the line. Heretofore and prior to my invention attempts have been made to use for this purpose an electrical dynamometer and by well-known electrical laws to determine in absolute units the current strength. For many reasons this method is objectionable in practice, but more particularly on account of the great sensitiveness necessary in such apparatus when applied to this purpose, thus rendering it very unsuitable for practical every-day work.

To supply the obvious need of some simple but thoroughly efficient device for readily determining the strength of a telephonic or similar current at any place in the circuit and derived from any instrument, coil, or combination, I have devised the arrangement which I am now about to describe, and which will be more specifically pointed out in the claims which conclude this specification.

It will be seen that I have totally discarded the idea of measuring the efficiency in ampères, believing that for this and analogous purposes other standards might be adopted which would be more generally convenient.

In the drawings, Figure 1 is a perspective view of the apparatus I employ. Fig. 2 is a plan of the same. Fig. 3 is a diagram of the electrical connections, and Fig. 4 is a plan view of a modification.

Considering, first, the construction exemplified in Figs. 1, 2, and 3, two helices of insulated wire, 4 and 5, are mounted on the horizontal rod 3, which is preferably of metal, but which may, if desired, be of non-conducting material. In the latter case, however, for the facilitation of connections, it will be necessary to have a continuous conductor let into its surface, with which one of the coils, being movable, will make contact. The rod 3 is detachably mounted upon standards 1 and 2 and may be of any convenient length. The coil or helix 4 is fixed and may be held in place by screws passing through the standard 2 and entering its substance, whereas the coil 5 is movable and slides along the rod 3 from one end to the other, if desired, whereby its distance from 4 may be varied at will. A scale, 7, graduated to any preferred measure of length, is mounted upon standards 6 in close proximity to the moving coils, so that the degree of movement thereof may readily be observed and noted. This is for convenience preferably of metal, as I desire to avail myself of it in arranging the electrical connections of the movable coil, and I have made it of brass, which I find well suited for the purpose. The two terminals of the fixed coil 4 are united with the binding-screws $c$ and $d$, and in the present case intermediate connections, 12 and 13, are provided. These, however, are not absolutely essential and may be omitted without detriment to the operation of the instrument. One of the terminals of the movable coil 5 is soldered to the metal spool $m$, on which the helix is wound, and this spool, being continually in contact with the rod 3, forms electrical connection with the standard 1, and thence by wire 19 with binding-screw $b$. The other terminal of the coil 5 is united to a frictional contact-spring, 9, carried on a bracket, 8, attached to the side of the spool $m$, but carefully insulated therefrom, and this spring clasps and slides upon the metal scale 7, making electrical connection therewith, and through the said scale, by means of supporting-post 6 and wire 18, with the key-anvil or front contact, 11. A circuit closing and breaking key, 10, is also provided, which is permanently connected by wire with the binding-screw $a$.

The entire apparatus is mounted upon a base-board, A.

The diagram, Fig. 3, clearly shows the electrical connections of the instrument when in operation. The coil 4 is represented as being in connection through its binding screws $c$ and $d$ and leading-wires 16 and 17 with the secondary helix of an induction-coil, $e$, the primary helix of which is in the circuit $f$ of a battery, B, and a telephone-transmitter, M. This coil 4, it will be noted, is totally insulated from the supporting-rod 3. The coil 5 is shown as being in contact at one of its terminals with the rod 3 and at the other with the contact-spring 9, carried by the bracket 8 upon the scale 7. A pointer or indicating-needle, $p$, is also mounted on the said bracket and indicates the extent of movement made by the coil 5 from its initial point. If very exact measurements are required, a vernier may be substituted for the pointer. The scale is in electrical connection with the anvil of the key 10. The stem of the key 10 connects with binding-screw $a$, the slide-rod 3 with binding-screw $b$, and the two binding-screws with wires 14 and 15, leading to a magneto telephone, T.

Considering, now, the modification shown in diagram by Fig. 4, the stationary coil 4 is there fixed at the center of the rod 3, which is capable of being rotated by the hand-wheel $h$ in the bearings $p'$ and $p^2$. This coil, as before, is connected by wires 16 and 17 with a battery, B, and microphone M. It has, however, movable coils 5 and $5^a$, one on each side of it, these having their centers threaded to correspond with right and left handed threads cut on the rod 3. The movable coils, being prevented by their spring-clasps, which bear upon the scale 7, from rotating with the rod 3, respectively recede from or approach the central and fixed coil as the rod 3 is rotated by the hand-wheel $h$. The two coils 5 and $5^a$ are so connected as to re-enforce the action of each other, and by using this form of apparatus I am enabled to utilize the induction from both sides of the fixed coil and to obtain more intensified action in the receiving-telephone. The telephone T is by wires 14 and 15 in serial circuit with the coils 5 and $5^a$.

I have not thought it necessary to describe the mechanical methods of connecting the circuits with the fixed and movable coils, as there are many modes well known to those skilled in the art.

I will now proceed to describe the operation of the apparatus. The circuit conveying the current to be measured is connected with the coil 4 by its binding-screws $c$ and $d$, the transmitter or other current-varier being located out of hearing to prevent confusion of sounds. The two terminals of a magneto-telephone are connected with the binding-screws $a$ and $b$. The two coils 4 and 5 being side by side, any variation of the current in 4 will excite by induction a current in the coil 5 if the key 10 be depressed, and the vigor or strength of this induced current may be determined by its action in the telephone-instrument T. If the coil 5 be moved farther and farther from the coil 4, a point is at last reached where absolute silence is obtained, and when this point is arrived at the efficiency of the current in the circuit is represented by the square of the distance between the two coils. As the strength of the current is directly dependent upon the efficiency of the transmitter, and as the inductive effect is dependent upon the strength of the current, a basis of comparison can now readily be established.

If the efficiency of a number of transmitters is to be compared, it will, to obtain the most accurate results, be requisite to use in each measurement the same induction coil and battery, and it will be necessary to provide a constant battery. On the other hand, if it be desired to test the respective merits of a series of induction-coils, it will be advisable to employ the same transmitter for all. Again, if it be required to ascertain the fall in current along a line, I first determine the distance between the coils at which silence is obtained when the apparatus is connected in circuit but a few feet or a short distance from transmitter M, and observe how much nearer together the coils have to be placed at succesively-increased distances from the transmitting end of the line. In this way it becomes easy to map out with great accuracy the conditions of a telephone-line, as well as the carrying-power of a transmitter. The key 10, though not essential, is introduced to break and make the circuit of the receiving-telephone, and is of great assistance in determining with accuracy the precise point where absolute silence is obtained.

It is of course conceivable that the application of this invention is not restricted to the examination and comparison of telephonic currents only. While especially adapted for this kind of work, it is also well adapted for use in many other measurements which will suggest themselves to those skilled in the art. It will be found convenient, for example, to use in comparing the efficiency of different batteries, and in such a case it would be necessary to include a circuit-breaker in the battery-circuit in order that induction might be exercised.

When it is desired to measure the efficiency of a telephone, dispensing with the intermediation of an induction-coil, it will be best to use coils 4 and 5 wound with coarser wire, and consequently having a lower resistance than if an induction-coil were used, and it is also advisable under such circumstances to employ a low-resistance speaking-telephone. I may also, without departing from my present invention, invert the arrangement of the coils and connect the telephone to the fixed and the transmitter to the movable coil.

I claim—

1. An instrument for the comparative measurement of electrical currents, comprising, in combination, a single coil or helix in a circuit conducting a current to be measured or compared, an additional coil or coils in a circuit including a receiving-telephone, a support for said coils, and means whereby one coil can be moved toward and away from the other until a point is determined where the current in the first coil ceases to act inductively on the second coil or coils, substantially as described.

2. An instrument for the comparative measurement of electrical currents, comprising, in combination, a single coil or helix fixed upon a rod or bar and connected in a circuit conducting a current to be measured or compared, and including also a circuit-breaker, an additional coil or coils adapted to be moved on said rod or bar toward and away from the first coil to determine the point where the current in the latter ceases to act inductively upon the second coil or coils, and a graduated scale for measuring the distance between said coils, substantially as described.

3. The method of comparing and measuring telephonic currents, which consists in causing the said currents to circulate through a helix, in noting the induced currents excited in the circuit of an adjacent and parallel helix of like character by means of a telephone included in said second coil, and in increasing the distance between the two helices until a point is reached where the induction between them ceases, substantially as described.

4. The method of comparing and measuring electrical currents, consisting in causing them to exercise an inductive effect upon an independent electrical circuit including a telephone, in gradually withdrawing the said independent circuit from such influence, and in observing and comparing the points in each case at which such inductive effect becomes imperceptible, substantially as described.

5. The combination, substantially as hereinbefore described, in an instrument for comparing and measuring telephonic currents, of two or more flat coils of insulated wire, one fixed and the other or others movable upon a supporting metal rod, whereby the movable coil or coils may be moved to and from the fixed coil, but at all times in parallelism therewith, a metal graduated scale mounted in proximity to the said coils and extending parallel to the supporting-bar thereof, one of the terminals of the said movable coil or coils being connected with the supporting-rod and the other with the metal scale, and the said fixed coil being insulated from both and having its terminals connected with independent binding-screws, for the purposes specified.

6. The combination of a flat helix or coil of insulated wire in a circuit conducting a current to be measured or compared, an additional coil or coils of like character in a circuit including a magneto-telephone, a supporting rod or bar for said coils, the first being fixed and the latter movable thereon, as described, a graduated scale extending parallel with said supporting-rod throughout its length, a pointer carried by the movable coil or coils for indicating on the scale the distance moved along the supporting-rod from the fixed coil, and a circuit closing and breaking key in circuit with the movable coil, substantially as described.

7. In an instrument for comparing and measuring the efficiency of telephone-transmitters and like instruments, the combination of a base-board, a rod or bar mounted in suitable standards thereon, fixed and movable coils or helices mounted on said rod and adapted to be included, as described, in independent electric circuits, a graduated scale mounted, also, on standards attached to said base-board and extended parallel to the coil-supporting rod throughout its length, a needle or pointer mounted on the movable coil or coils and moving over the said scale to indicate the extent of motion of said coil or coils, and a circuit-breaking key in the circuit of said movable coil, all substantially as described.

8. The combination of a flat helix or coil of insulated wire fixed upon a supporting-rod and connected in a circuit conducting a current to be measured or compared, two movable coils or helices mounted on said rod on opposite sides of the first helix and connected in circuit with a magneto-telephone, and means for moving the two last-named coils simultaneously toward and away from the fixed coil, substantially as and for the purpose set forth.

In testimony whereof I have signed my name to this specification, in the presence of two subscribing witnesses, this 18th day of April, 1887.

HAMMOND V. HAYES.

Witnesses:
GEO. WILLIS PIERCE,
FRED J. F. SCHWARTZ.